(12) United States Patent
Hyodo

(10) Patent No.: US 11,556,034 B2
(45) Date of Patent: Jan. 17, 2023

(54) DISPLAY DEVICE

(71) Applicant: Japan Display Inc., Tokyo (JP)

(72) Inventor: Yosuke Hyodo, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/455,742

(22) Filed: Nov. 19, 2021

(65) Prior Publication Data

US 2022/0171223 A1 Jun. 2, 2022

(30) Foreign Application Priority Data

Nov. 27, 2020 (JP) .............................. JP2020-197062

(51) Int. Cl.
*G02F 1/1347* (2006.01)
*G02F 1/1362* (2006.01)
*G02F 1/1343* (2006.01)

(52) U.S. Cl.
CPC ...... *G02F 1/1347* (2013.01); *G02F 1/134309* (2013.01); *G02F 1/136209* (2013.01); *G02F 1/136286* (2013.01); *G02F 2202/28* (2013.01); *G02F 2203/48* (2013.01)

(58) Field of Classification Search
CPC ......... G02F 1/134309; G02F 1/136209; G02F 1/136286; G02F 2202/28; G02F 2203/48; G02F 1/133601; G02F 1/1347
See application file for complete search history.

(56) References Cited

U.S. PATENT DOCUMENTS

2018/0031897 A1    2/2018   Kikuchi et al.
2018/0275438 A1*   9/2018   Mori ................. G02F 1/133514

FOREIGN PATENT DOCUMENTS

JP        2018-18043 A     2/2018

* cited by examiner

*Primary Examiner* — James A Dudek
(74) *Attorney, Agent, or Firm* — Maier & Maier, PLLC

(57) ABSTRACT

According to one embodiment, a display device includes a first display panel, a second display panel and an adhesive layer. The first display panel includes a first light-shielding pattern. The first light-shielding pattern extend along first scanning lines and first signal lines. The second display panel includes a second light-shielding pattern. The second light-shielding pattern includes a first light-shielding portion extending along second scanning lines and second signal lines, and a second light-shielding portion overlapping first pixels of the first display panel in planar view.

9 Claims, 13 Drawing Sheets

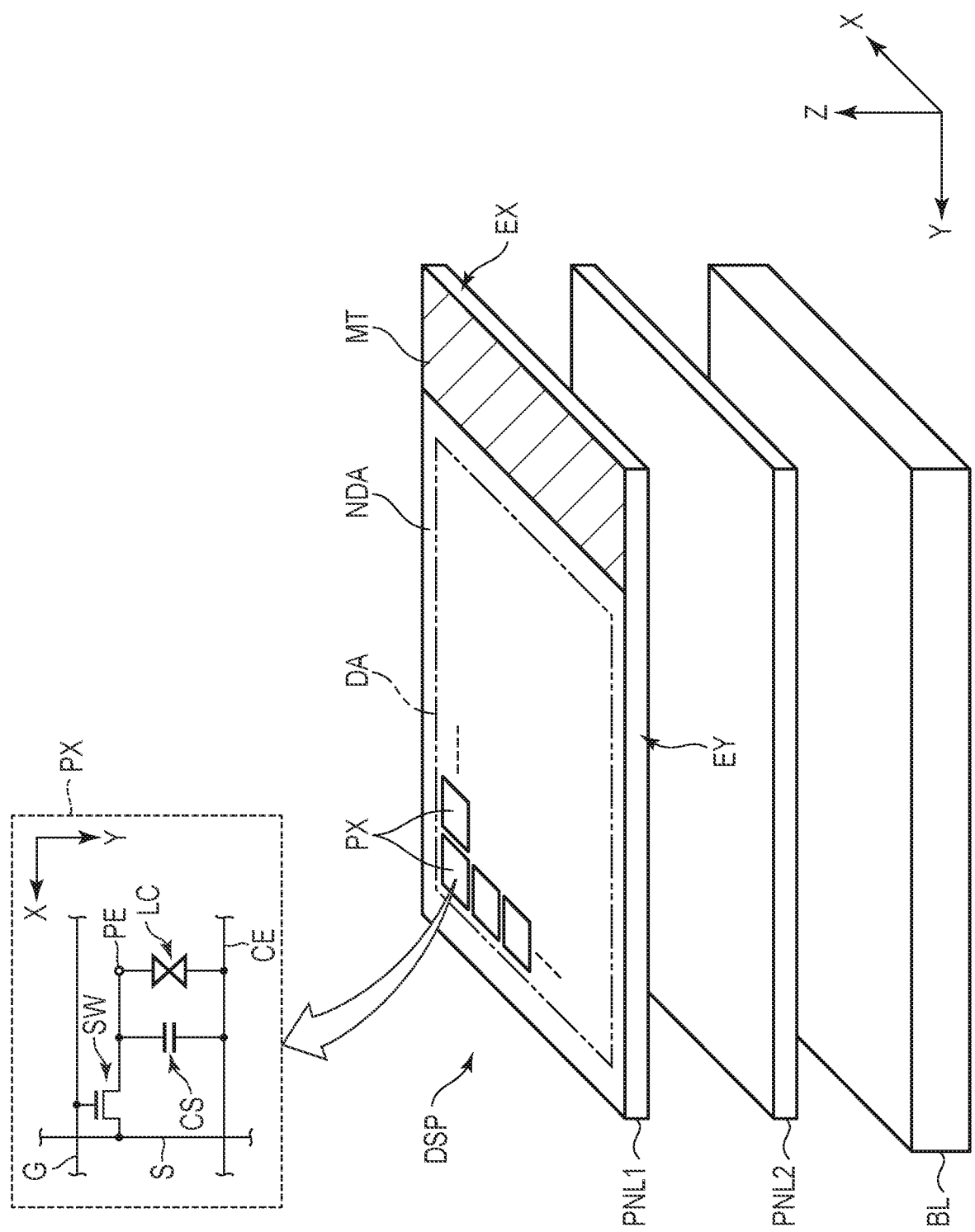
F I G. 1

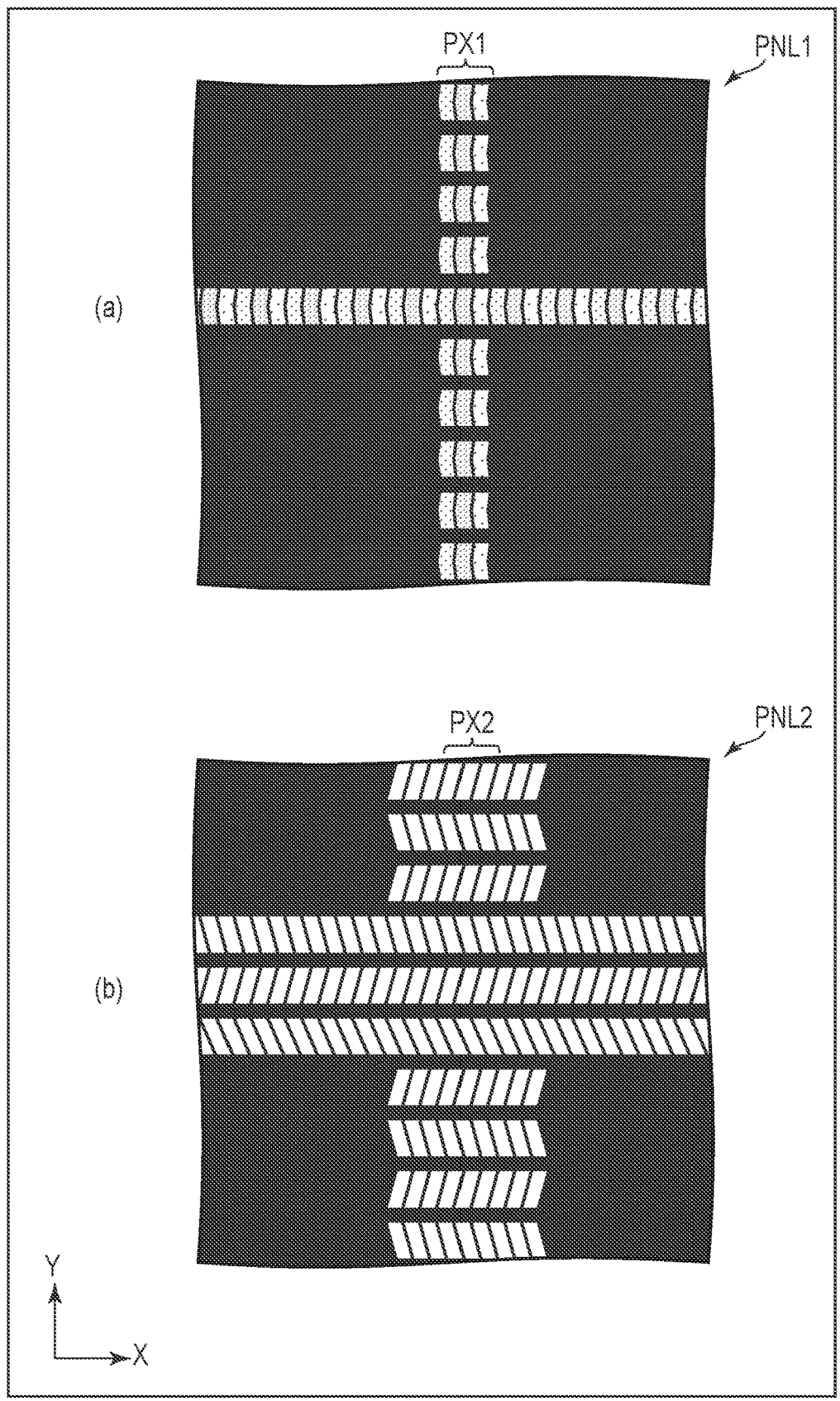
F I G. 14

DISPLAY DEVICE

CROSS-REFERENCE TO RELATED APPLICATIONS

This application is based upon and claims the benefit of priority from Japanese Patent Application No. 2020-197062, filed Nov. 27, 2020, the entire contents of which are incorporated herein by reference.

FIELD

Embodiments described herein relate generally to a display device.

BACKGROUND

Recently, in order to improve contrast of a display device, a technology using a display panel for light control in addition to a display panel for image display has been developed. However, this technology has a problem that light-shielding patterns provided on the two display panels interfere with each other and cause moire (interference fringes).

BRIEF DESCRIPTION OF THE DRAWINGS

FIG. 1 is a decomposed perspective view illustrating a configuration example of a display device including two display panels.

FIG. 14 is a plan view schematically illustrating a shape of the pixels disposed in the liquid crystal display panel and a shape of the pixels disposed in the dimming panel according to the embodiment.

DETAILED DESCRIPTION

Figure 2:
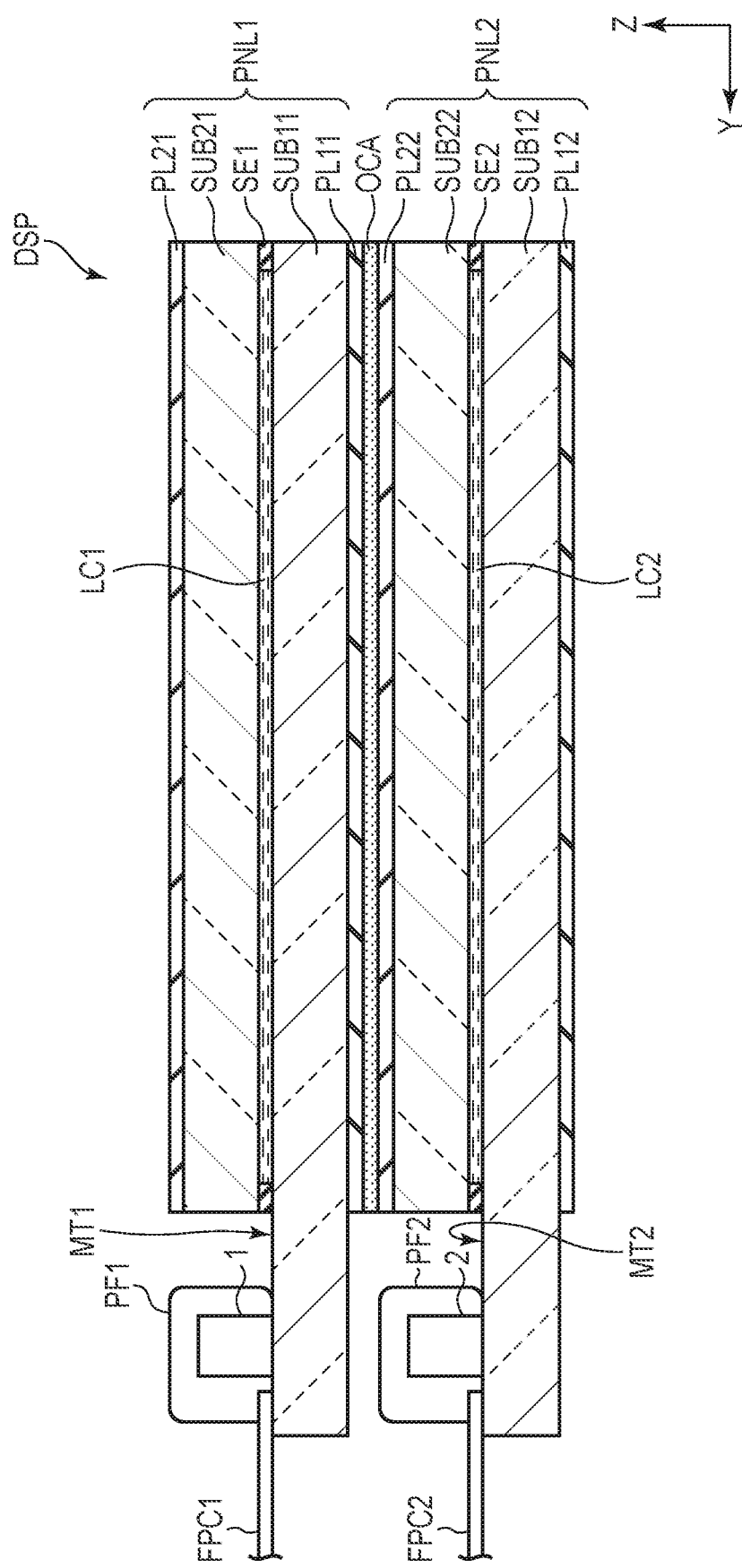
FIG. 2 is a cross-sectional view schematically illustrating the configuration of the display device illustrated in FIG. 1.

In general, according to one embodiment, a display device includes a first display panel, a second display panel and an adhesive layer. The first display panel includes a display area for displaying an image. The second display panel includes a dimming area for controlling brightness of the display area. The adhesive layer bonds the first display panel and the second display panel to each other. The first display panel includes a plurality of first scanning lines, a plurality of first signal lines, a plurality of first pixels and a first light-shielding pattern. The first scanning lines extend along a first direction. The first signal lines extend in a second direction intersecting the first direction. Each of the first pixels are disposed in a region partitioned by the first scanning lines and the first signal lines. The first light-shielding pattern extend along the first scanning lines and the first signal lines. The second display panel includes a plurality of second scanning lines, a plurality of second signal lines, a plurality of second pixels and a second light-shielding pattern. The second scanning lines extend along the first direction. The second signal lines extend in the second direction. Each of the second pixels are disposed in a region partitioned by the second scanning lines and the second signal lines. The second light-shielding pattern includes a first light-shielding portion extending along the second scanning lines and the second signal lines, and a second light-shielding portion overlapping the first pixels of the first display panel in planar view.

Embodiments will be described hereinafter with reference to the accompanying drawings.

The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a decomposed perspective view schematically showing a configuration of a display device DSP1 comprising two display panels. FIG. 1 shows a three-dimensional space defined by a first direction X, a second direction Y perpendicular to the first direction X and a third direction Z perpendicular to the first direction X and the second direction Y. The first direction X and the second direction Y are orthogonal to each other, but they may intersect at an angle other than 90 degrees. In the following descriptions, a direction forwarding a tip of an arrow indicating the third direction Z is referred to as "upward" and a direction forwarding oppositely from the tip of the arrow is referred to as "downward". With such expressions "a second member above a first member" and "a second member below a first member", the second member may be in contact with the first member or may be remote from the first member. Further, it is assumed that there is an observation position to observe the semiconductor substrate on a tip side of an arrow in a third direction Z, and viewing from this observation position toward the X-Y plane defined by the first direction X and the second direction Y is referred to as a planar view.

As shown in FIG. 1, a display device DSP includes a liquid crystal display panel PNL1, a dimming panel PNL2, and a backlight unit BL. As shown in FIG. 1, the dimming panel PNL2 is disposed between the liquid crystal display panel PNL1 and the backlight unit BL, so that contrast of an image displayed on the liquid crystal display panel PNL1 can be improved.

For example, the liquid crystal display panel PNL1 has a rectangular shape. In the example illustrated, the liquid crystal display panel PNL1 has shorter sides EX parallel to the first direction X and longer sides EY parallel to the second direction Y. A thickness direction of the liquid crystal display panel PNL1 corresponds to the third direction Z. The liquid crystal display panel PNL1 has a main surface parallel to the X-Y plane defined by the first direction X and the second direction Y. The liquid crystal display panel PNL1 includes a display area DA and a non-display area NDA located outside the display area DA. The non-display area NDA includes a mounting area MT on which a driver integrated circuit (IC) and a flexible printed circuit are mounted. In FIG. 1, the mounting area MT is indicated by hatching.

The display area DA is an area that displays an image, and includes, for example, a plurality of pixels PX arrayed in a matrix. As shown in an enlarged manner in FIG. 1, each pixel PX is disposed in a region partitioned by scanning lines G and signal lines S and includes a switching element SW, a pixel electrode PE, a common electrode CE, a liquid crystal layer LC, and the like.

The switching element SW includes, for example, a thin-film transistor (TFT) and is electrically connected to the scanning line G and the signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. Each of the pixel electrodes PE is opposed to the common electrode CE, and the liquid crystal layer LC is driven by an electric field generated between the pixel electrode PE and the common electrode CE. A capacitance CS is formed, for example, between an electrode having the same electric potential as the common electrode CE and an electrode having the same electric potential as the pixel electrode PE.

The mounting area MT extends along the shorter side EX of the liquid crystal display panel PNL1. The mounting area MT has a terminal, via which the liquid crystal display panel PNL1 is electrically connected to an external device such as a flexible printed circuit, for example.

Although a detailed configuration is not shown in FIG. 1, the dimming panel PNL2 has basically the same configuration as the liquid crystal display panel PNL1. Incidentally, some differences in the configuration between the liquid crystal display panel PNL1 and the dimming panel PNL2 will be described later together with description of FIGS. 2 and 3.

The backlight unit BL is disposed on a lower side of the dimming panel PNL2, and light from this backlight unit BL is controlled for each pixel PX to display an image.

FIG. 2 is a cross-sectional view schematically illustrating the configuration of the display device DSP illustrated in FIG. 1.

As described above together with the description of FIG. 1, the display device DSP includes the liquid crystal display panel PNL1, the dimming panel PNL2, and the backlight unit BL. Incidentally, the backlight unit BL is not shown in FIG. 2. The liquid crystal display panel PNL1 and the dimming panel PNL2 are bonded to each other by, for example, a transparent adhesive layer OCA. Incidentally, the liquid crystal display panel PNL1 and the dimming panel PNL2 are positionally adjusted such that their common configuration elements overlap each other in planar view, and are bonded to each other by the adhesive layer OCA.

Hereinafter, first, the configuration of the liquid crystal display panel PNL1 will be described.

As shown in FIG. 2, the liquid crystal display panel PNL1 includes a first substrate SUB11, a second substrate SUB21, a liquid crystal layer LC1, a first polarizer PL11, and a second polarizer PL21.

The liquid crystal layer LC1 is held between the first substrate SUB11 and the second substrate SUB21 and is sealed therein by sealant SE1. The first polarizer PL11 is disposed below the first substrate SUB11, and the second polarizer PL21 is disposed above the second substrate SUB21. A polarization axis of the first polarizer PL11 and a polarization axis of the second polarizer PL2*l* have, for example, a crossed-Nicols relationship, that is, make a 90-degree angle to each other.

The liquid crystal display panel PNL1 has a mounting area MT1 on which a driver IC 1 and a flexible printed circuit FPC1 are mounted. The driver IC 1 and the flexible printed circuit FPC1 mounted on the mounting area MT1 are covered with a protective film PF1.

Next, the configuration of the dimming panel PNL2 will be described.

As shown in FIG. 2, similarly to the liquid crystal display panel PNL1, the dimming panel PNL2 includes a first substrate SUB12, a second substrate SUB22, a liquid crystal layer LC2, a first polarizer PL12, and a second polarizer PL22.

The liquid crystal layer LC2 is held between the first substrate SUB12 and the second substrate SUB22 and is sealed therein by sealant SE2. The first polarizer PL12 is disposed below the first substrate SUB12, and the second polarizer PL22 is disposed above the second substrate SUB22. A polarization axis of the first polarizer PL12 and a polarization axis of the second polarizer PL22 have, for example, the crossed-Nicols relationship, that is, make a 90-degree angle to each other. In addition, the polarization axis of the first polarizer PL11 of the liquid crystal display panel PNL1 and the polarization axis of the second polarizer PL22 of the dimming panel PNL2 are in the same direction.

The dimming panel PNL2 has a mounting area MT2 on which a driver IC 2 and a flexible printed circuit FPC2 are mounted. The driver IC 2 and the flexible printed circuit FPC2 mounted on the mounting area MT2 are covered with a protective film PF2.

Herein, the configuration of the display device DSP will be described in more detail with reference to a cross-sectional view of FIG. 3.

Hereinafter, first, the configuration of the liquid crystal display panel PNL1 will be described in detail.

As described above together with the description of FIG. 2, the liquid crystal display panel PNL1 includes the first substrate SUB11, the second substrate SUB21, the liquid crystal layer LC1, the first polarizer PL11, and the second polarizer PL21.

Figure 3:
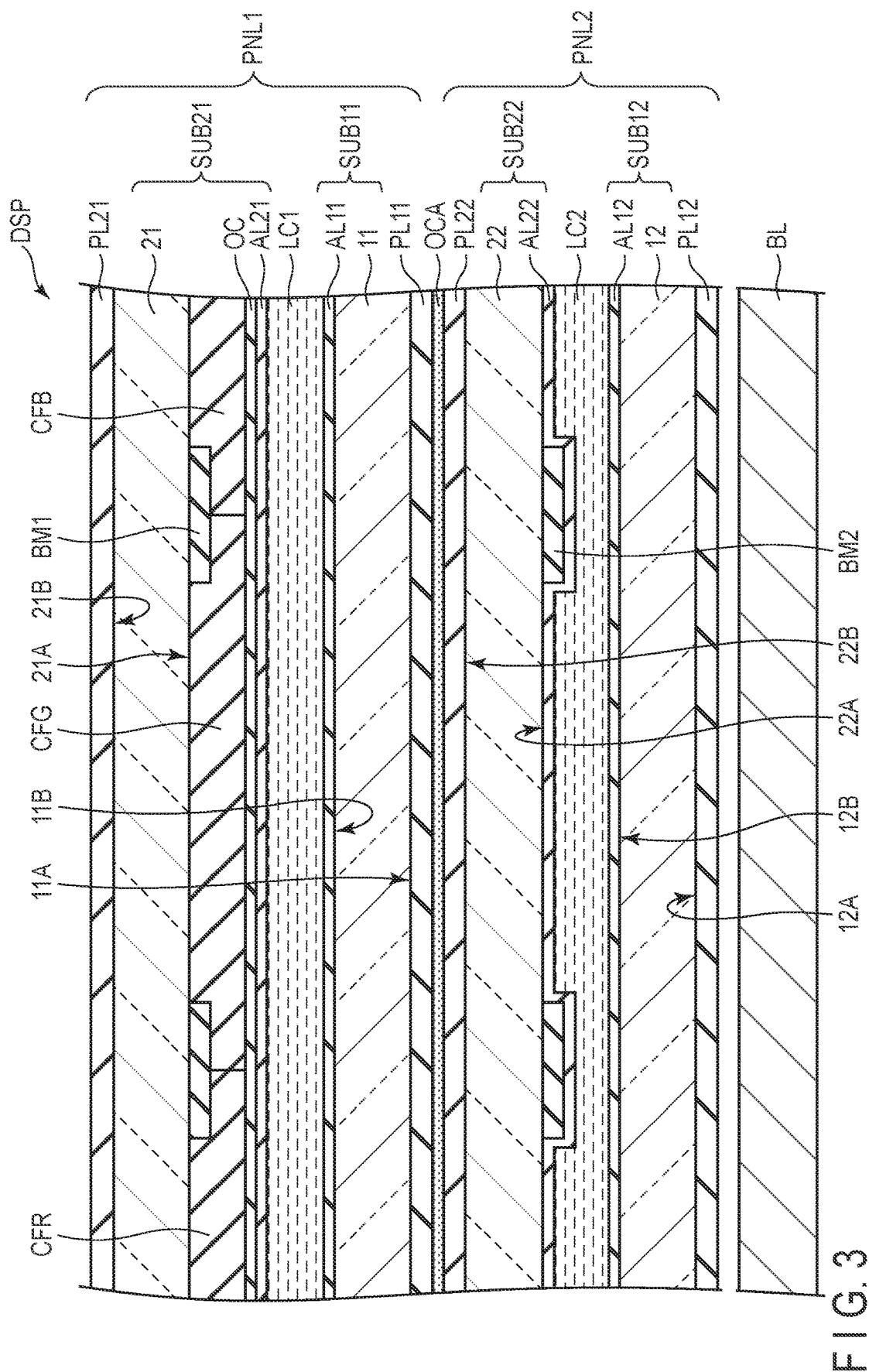
FIG. 3 is a cross-sectional view illustrating a cross section of the display device illustrated in FIG. 2 in more detail.

As shown in FIG. 3, the first substrate SUB11 includes a first transparent substrate 11 and an alignment film AL11. Besides the above-described configuration, the first substrate SUB11 includes, for example, scanning lines G (more specifically, scanning lines G1 to be described later), signal lines S (more specifically, signal lines S1 to be described later), switching elements SW, pixel electrodes PE, a common electrode CE, and the like illustrated in FIG. 1, but these are not shown in FIG. 3.

The first transparent substrate 11 has a main surface (lower surface) 11A and a main surface (upper surface) 11B opposite to the main surface 11A. On a main surface 11B side of the first transparent substrate 11, the scanning lines G, the signal lines S, the switching elements SW, the pixel electrodes PE, the common electrode CE, and the like are provided. The alignment film AL11 in contact with the liquid crystal layer LC1 is further provided on the main surface 11B side of the first transparent substrate 11. The first polarizer PL11 is bonded to the main surface 11A side of the first transparent substrate 11.

As shown in FIG. 3, the second substrate SUB21 includes a second transparent substrate 21, a light-shielding film BM1, a color filter CF, an overcoat film OC, and an alignment film AL21. Incidentally, the light-shielding film BM1 may be referred to as a light-shielding pattern.

The second transparent substrate 21 has a main surface (lower surface) 21A and a main surface (upper surface) 21B opposite to the main surface 21A. The main surface 21A of the second transparent substrate 21 is opposed to the main surface 11B of the first transparent substrate 11. The light-shielding film BM1 is provided on a main surface 21A side of the second transparent substrate 21 and partitions pixels PX (more specifically, pixels PX1 to be described later) in a similar manner as the scanning lines G and the signal lines S. The light-shielding film BM1 overlaps a part of the color filter CF. The color filter CF includes a red color filter CFR, a green color filter CFG, a blue color filter CFB, and the like. The overcoat film OC covers the color filter CF. The overcoat film OC can prevent pigment constituting the color filter CF from seeping into the liquid crystal layer LC1. The alignment film AL21 covers the overcoat film OC and is in contact with the liquid crystal layer LC1. The second polarizer PL21 is bonded to the main surface 21B side of the second transparent substrate 21.

The first transparent substrate 11 and the second transparent substrate 21 are, for example, insulating substrates such as glass substrates or plastic substrates. The light-shielding film BM1 is preferably formed of a black resin in which black pigment or the like is dispersed. The alignment films AL11 and AL21 are horizontal alignment films having an alignment restriction force substantially parallel to the X-Y plane. The alignment restriction force may be imparted by rubbing treatment or by photo-alignment treatment.

Next, the configuration of the dimming panel PNL2 will be described in detail.

As described above together with the description of FIG. 2, the dimming panel PNL2 includes the first substrate SUB12, the second substrate SUB22, the liquid crystal layer LC2, the first polarizer PL12, and the second polarizer PL22.

As shown in FIG. 3, the first substrate SUB12 includes a first transparent substrate 12 and an alignment film AL12. Besides the above-described configuration, as in the liquid crystal display panel PNL1, the first substrate SUB12 includes scanning lines G (more specifically, scanning lines G2 to be described later), signal lines S (more specifically, signal lines S2 to be described later), switching elements SW, pixel electrodes PE, a common electrode CE, and the like, but these are not shown in FIG. 3.

The first transparent substrate 12 has a main surface (lower surface) 12A and a main surface (upper surface) 12B opposite to the main surface 12A. On a main surface 12B side of the first transparent substrate 12, the scanning lines G, the signal lines S, the switching elements SW, the pixel electrodes PE, the common electrode CE, and the like are provided. The alignment film AL12 in contact with the liquid crystal layer LC2 is further provided on the main surface 12B side of the first transparent substrate 12. The first polarizer PL12 is bonded to the main surface 12A side of the first transparent substrate 12.

As shown in FIG. 3, the second substrate SUB22 includes a second transparent substrate 22, a light-shielding film BM2, and an alignment film AL22. The light-shielding film BM2 may be referred to as a light-shielding pattern similarly to the light-shielding film BM1.

Unlike the liquid crystal display panel PNL1, the dimming panel PNL2 is intended to control brightness and is not required to form a color image. Thus, the second substrate SUB22 of the dimming panel PNL2 has no color filters CF. The dimming panel PNL2 is also different from the liquid crystal display panel PNL1 in that the dimming panel PNL2 has no overcoat films OC. This is because preventing the pigment (resin) from seeping into the liquid crystal layer LC2 is not required owing to the absence of the color filter CF as described above.

The second transparent substrate 22 has a main surface (lower surface) 22A and a main surface (upper surface) 22B opposite to the main surface 22A. The main surface 22A of the second transparent substrate 22 is opposed to the main surface 12B of the first transparent substrate 12. The light-shielding film BM2 is provided on a main surface 22A side of the second transparent substrate 22 and partitions pixels PX (more specifically, pixels PX2 to be described later) in a similar manner as the scanning lines G and the signal lines S. The alignment film AL22 covers the light-shielding film BM2 and is in contact with the liquid crystal layer LC2. The second polarizer PL22 is bonded to the main surface 22B side of the second transparent substrate 22.

Incidentally, FIG. 3 illustrates a case where the light-shielding film BM2 is provided on a second transparent substrate 22 side. However, the present invention is not limited to this case, and the light-shielding film BM2 may be provided on a first transparent substrate 12 side. In addition, unlike the light-shielding film BM1 of the liquid crystal display panel PNL1, the light-shielding film BM2 may be formed of an untransparent metal material such as molybdenum (Mo), aluminum (Al), tungsten (W), titanium (Ti), or silver (Ag). Alternatively, like the light-shielding film BM1, the light-shielding film BM2 may be formed of a black resin in which black pigment or the like is dispersed. However, in order to suppress a decrease in an aperture ratio of each pixel PX, the light-shielding film BM2 is desirably formed of an untransparent metal material to have a line width of about 3 μm to 5 μm on the first transparent substrate 12 side. In this case, the light-shielding film BM2 may be connected to the common electrode CE. This configuration can achieve a low resistance value of the common electrode CE formed of indium tin oxide (ITO) or the like.

The first transparent substrate 12 and the second transparent substrate 22 are, for example, insulating substrates such as glass substrates or plastic substrates. The alignment films AL12 and AL22 are horizontal alignment films having an alignment restriction force substantially parallel to the X-Y plane. The alignment restriction force may be imparted by rubbing treatment or by photo-alignment treatment.

The liquid crystal display panel PNL1 and the dimming panel PNL2 are bonded to each other by, for example, a transparent adhesive layer OCA. Incidentally, the liquid crystal display panel PNL1 and the dimming panel PNL2 are positionally adjusted such that their common configuration elements (for example, the light-shielding film BM1 and the light-shielding film BM2, etc.) overlap each other in planar view, and are bonded to each other by the adhesive layer OCA.

The backlight unit BL is disposed below the dimming panel PNL2. Various forms of backlight unit can be used for the backlight unit BL, such as a backlight unit using as a light source a light-emitting diode (LED) or a cold-cathode fluorescent tube (CCFL), for example. Although not shown in FIG. 3, a cover member or the like may be further disposed on the second polarizer PL21 of the liquid crystal display panel PNL1.

Figure 4:
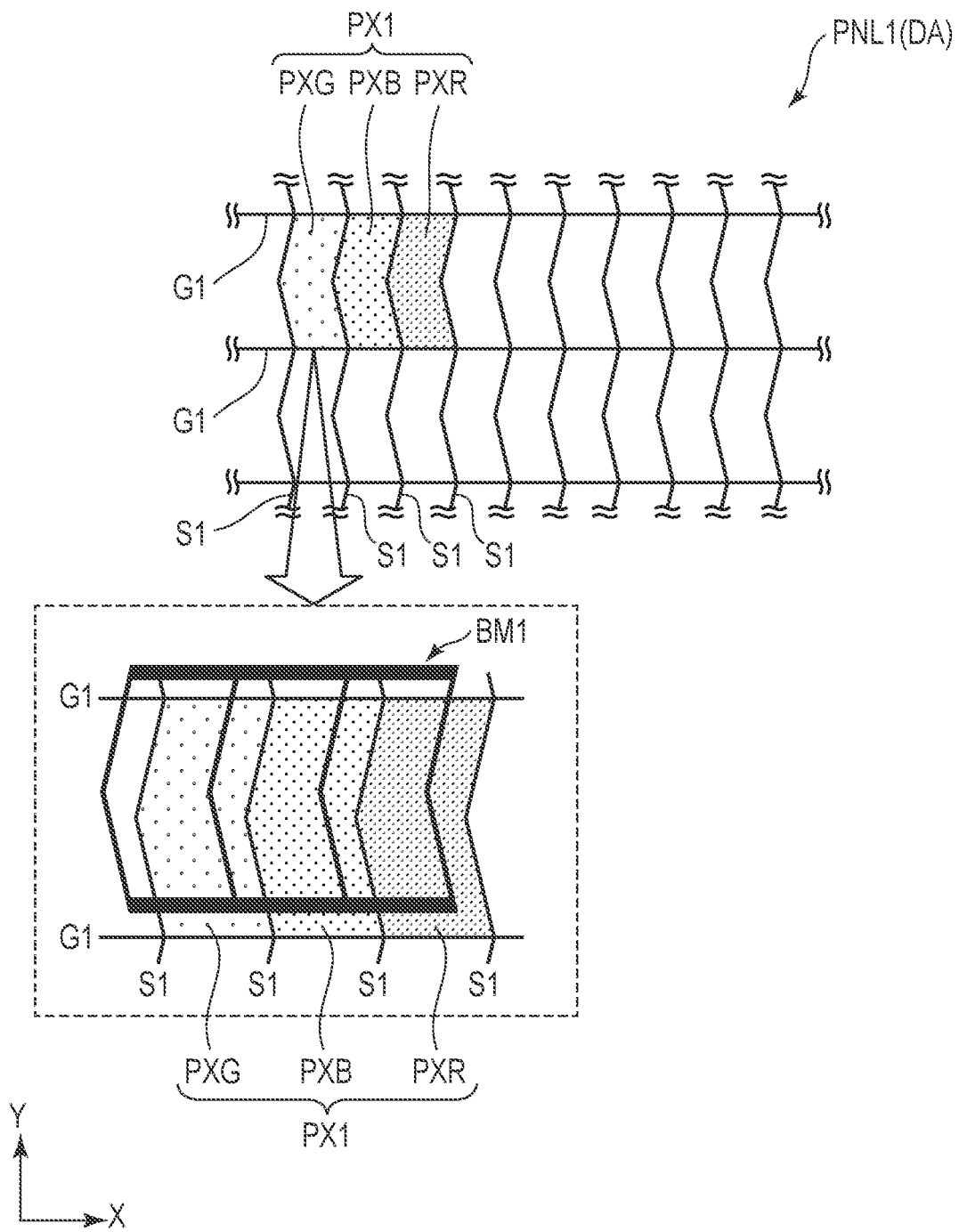
FIG. 4 is a view for explaining pixels and a light-shielding pattern disposed in a liquid crystal display panel according to an embodiment.
Figure 5:
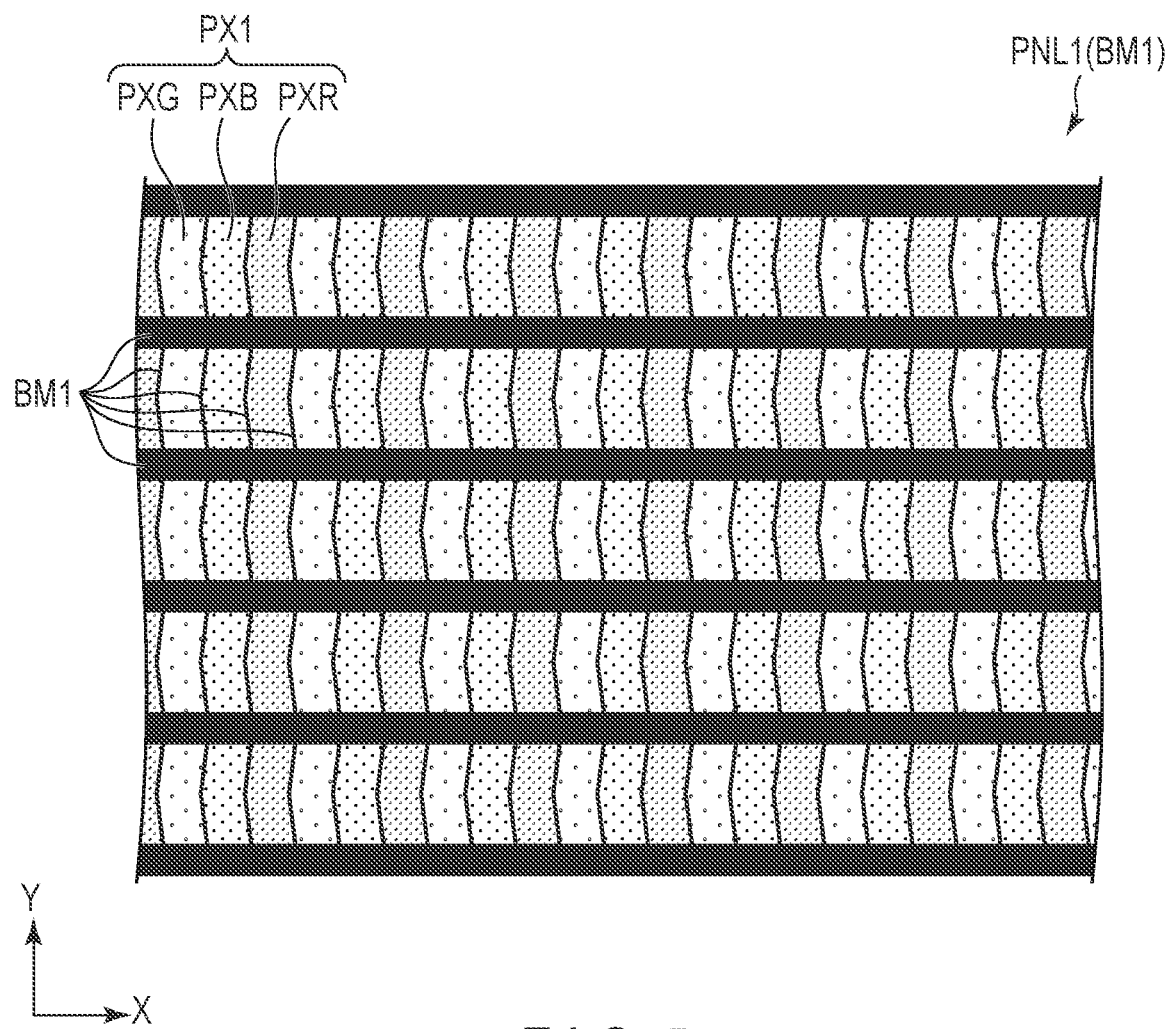
FIG. 5 is a plan view schematically illustrating a shape of the light-shielding pattern disposed in the liquid crystal display panel according to the embodiment.

FIG. 4 is a view for explaining a large number of pixels PX1 arrayed in a matrix in the display region DA of the liquid crystal display panel PNL1 and the light-shielding pattern BM1 with a grid disposed so as to surround each pixel PX1. FIG. 5 is a plan view schematically illustrating a shape of the light-shielding pattern BM1 disposed in the liquid crystal display panel PNL1.

As shown in FIGS. 4 and 5, a large number of the pixels PX1 are arrayed in a matrix in the display area DA of the liquid crystal display panel PNL1. In the present embodiment, the pixel PX1 includes green (G), blue (B), and red (R) sub-pixels PXG, PXB, and PXR. Incidentally, in FIGS. 4 and 5, the green sub-pixel PXG is indicated by low-density dots, the blue sub-pixel PXB is indicated by medium-density dots, and the red sub-pixel PXR is indicated by high-density dots. As shown in FIG. 4, each of the sub-pixels PXG, PXB, and PXR is disposed in a region partitioned by the scanning lines G1 and the signal lines S1. The scanning line G1 extends along the first direction X. The signal line S1 is bent into a chevron shape and extends in the second direction Y. For this reason, each of the sub-pixels PXG, PXB, and PXR disposed in a region partitioned by the scanning lines G1 and the signal lines S1 has a chevron shape.

As shown in the partially enlarged view of FIG. 4, in the liquid crystal display panel PNL1, the light-shielding pattern BM1 is disposed to conform with the scanning lines G1 and the signal lines S1. The light-shielding pattern BM1 is disposed so as to overlap the scanning lines G1 and the signal lines S1 in planar view, and includes portions extending along the first direction X like the scanning lines G1 and portions extending in the second direction Y while being bent into the chevron shape like the signal lines S1.

Figure 6:
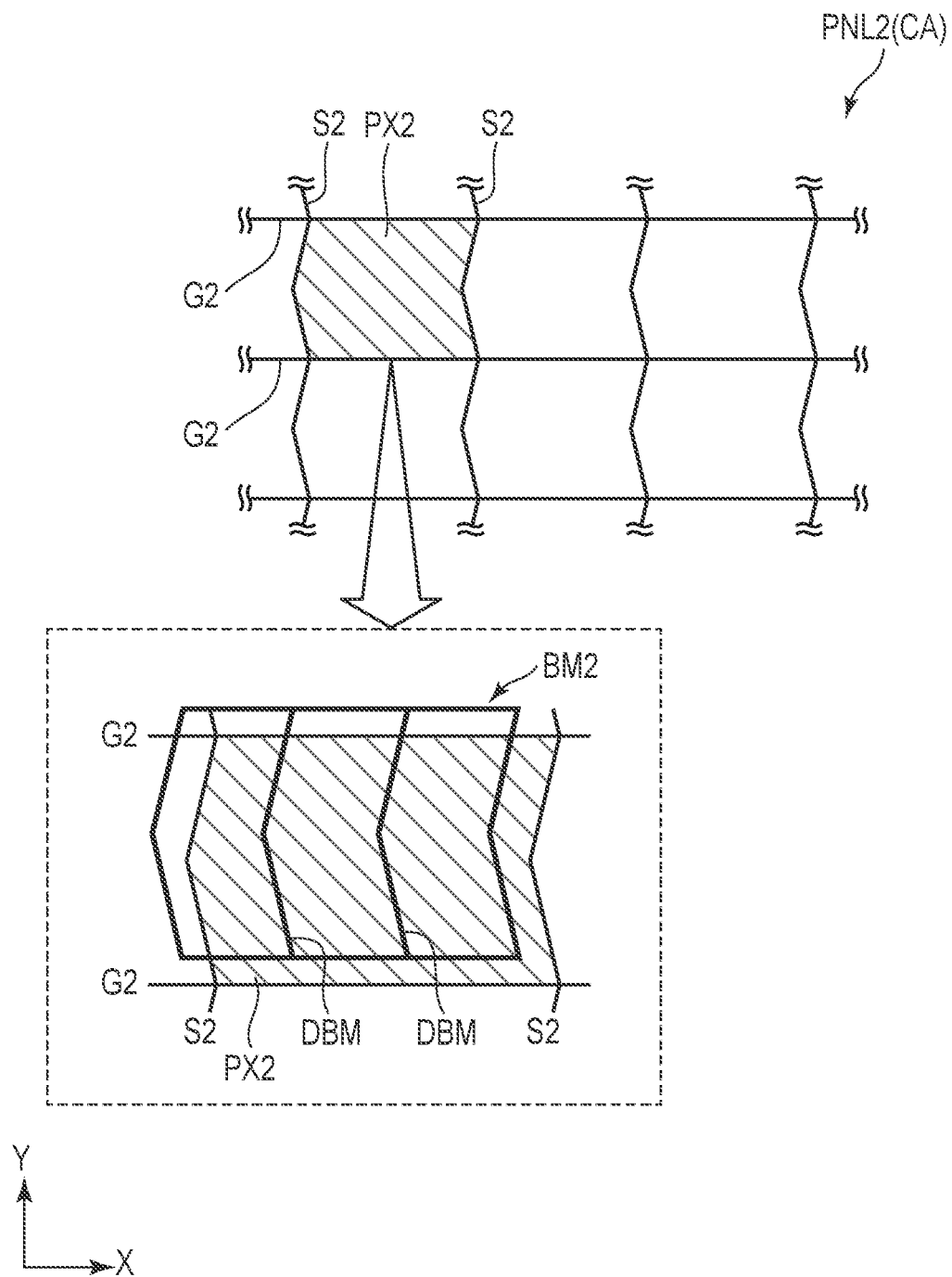
FIG. 6 is a view for explaining pixels and a light-shielding pattern disposed in a dimming panel according to the embodiment.

FIG. 6 is a view for explaining a large number of pixels PX2 arrayed in a matrix in a dimming area CA of the dimming panel PNL2 and the light-shielding pattern BM2 with a grid disposed so as to surround each pixel PX2.

The dimming area CA of the dimming panel PNL2 is an area corresponding to the display area DA of the liquid crystal display panel PNL1 and overlaps the display area DA in planar view. As shown in FIG. 6, a large number of the pixels PX2 are arrayed in a matrix in the dimming area CA. Unlike the liquid crystal display panel PNL1, the dimming panel PNL2 is intended to control brightness and is not required to form a color image. Thus, the dimming panel PNL2 has no color filters CF as described above. In other words, the pixel PX2 is different from the pixel PX1 of the liquid crystal display panel PNL1 in that the pixel PX2 includes no sub-pixels.

As shown in FIG. 6, the pixel PX2 is disposed in a region partitioned by the scanning lines G2 and the signal lines S2. The scanning line G2 extends along the first direction X similarly to the scanning line G1 of the liquid crystal display panel PNL1. The signal line S2 extends in the second direction Y while being bent into a chevron shape similarly to the signal line S1 of the liquid crystal display panel PNL1. For this reason, the pixel PX2 disposed in a region partitioned by the scanning lines G2 and the signal lines S2 has a chevron shape like the pixel PX1 of the liquid crystal display panel PNL1. Here, it is assumed that the pixel PX2 of the dimming panel PNL2 has the same area as the pixel PX1 of the liquid crystal display panel PNL1, and one pixel PX2 is disposed for one pixel PX1. However, the present invention is not limited to this case, and one pixel PX2 may be disposed for a plurality of pixels PX1. For example, one pixel PX2 may be disposed for four pixels PX1.

As shown in the partially enlarged view of FIG. 6, in the dimming panel PNL2, the light-shielding pattern BM2 is disposed to conform with the scanning lines G2 and the signal lines S2. The light-shielding pattern BM2 is disposed so as to overlap the scanning lines G2 and the signal lines S2 in planar view, and includes portions extending along the first direction X like the scanning lines G2 and portions extending in the second direction Y while being bent into the chevron shape like the signal lines S2.

Furthermore, the light-shielding pattern BM2 includes a dummy light-shielding pattern DBM overlapping the pixels PX2 in planar view, in addition to the portions extending along the scanning lines G2 and the signal lines S2. Since the pixels PX2 are positionally adjusted so as to overlap the pixels PX1 of the liquid crystal display panel PNL1 in planar view, the dummy light-shielding pattern DBM also overlaps the pixels PX1 in planar view.

FIG. 6 illustrates a case where the light-shielding pattern BM2 includes two lines of the dummy light-shielding pattern DBM corresponding to the signal lines S1 provided in the liquid crystal display panel PNL1. In other words, an interval along the first direction X between the signal line S2 and the line of the dummy light-shielding pattern DBM adjacent to the signal line S2, and an interval along the first direction X between the two lines of the dummy light-shielding pattern DBM are the same as a pitch (width) along the first direction X of the sub-pixels PXG, PXB, and PXR included in the pixels PX1 of the liquid crystal display panel PNL1.

Figure 7:
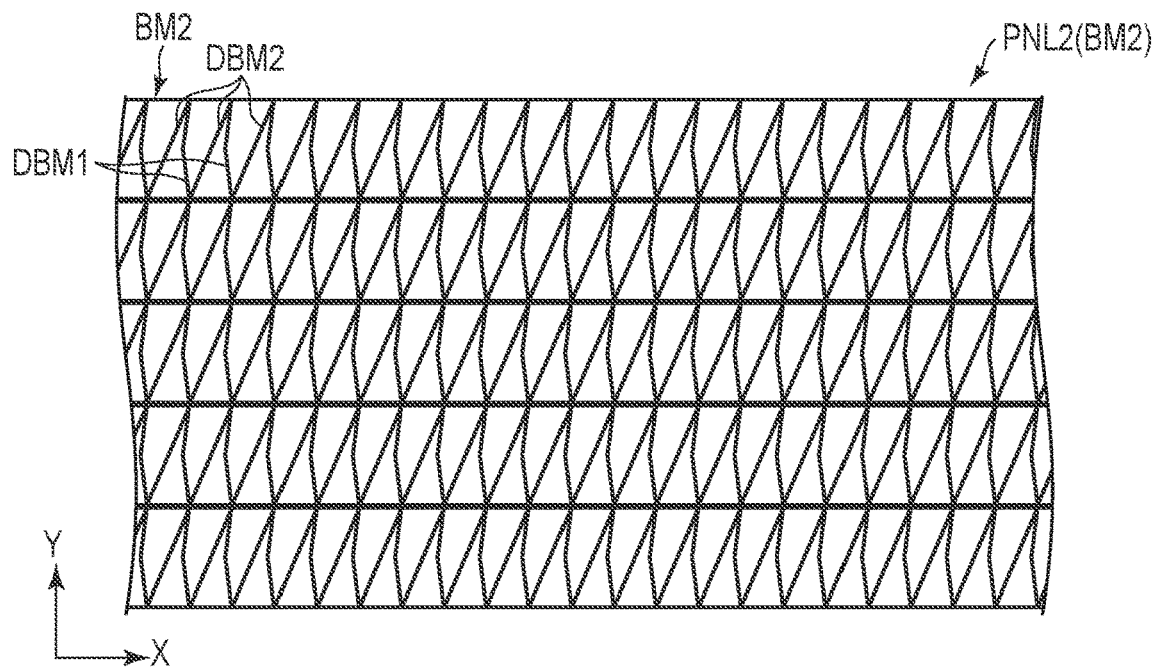
FIG. 7 is a plan view schematically illustrating a shape of the light-shielding pattern disposed in the dimming panel according to the embodiment.

Here, a shape of the light-shielding pattern BM2 will be described in detail with reference to FIG. 7. FIG. 7 is a plan view schematically illustrating the shape of the light-shielding pattern BM2 disposed in the dimming panel PNL2 according to the present embodiment.

As described above, the light-shielding pattern BM2 has the portions extending in the first direction X along the scanning lines G2 and the portions extending in the second direction Y while being bent into the chevron shape along the signal lines S2. In addition, the light-shielding pattern BM2 includes a dummy light-shielding pattern DBM1 corresponding to the signal lines S1 provided in the liquid crystal display panel PNL1. Furthermore, as shown in FIG.

7, the light-shielding pattern BM2 includes a dummy light-shielding pattern DBM2 having portions extending in an oblique direction so as to connect one of vertexes of each of chevron-shaped regions that overlap(coincide) in planar view with the sub-pixels PXG, PXB, and PXR included in the pixels PX1 of the liquid crystal display panel PNL1 and another of the vertexes located diagonally to that vertex. In other words, the light-shielding pattern BM2 includes the dummy light-shielding pattern DBM2 that halves each of the chevron-shaped regions that overlap(coincide) in planar view with the sub-pixels PXG, PXB, and PXR included in the pixels PX1 of the liquid crystal display panel PNL1. As described above, the dummy light-shielding patterns DBM1 and DBM2 both have the portions disposed at the same pitch as the sub-pixels PXG, PXB, and PXR included in the pixels PX1 of the liquid crystal display panel PNL1. The oblique direction described above intersects with both the first direction X and the second direction Y and is a direction different from these directions.

Hereinafter, advantageous effects of the display device DSP according to the present embodiment will be described using comparative examples. Incidentally, the comparative examples are used to describe a part of the advantageous effects that the display device DSP according to the present embodiment can achieve, not to exclude an advantageous effect common between the comparative examples and the present embodiment from the scope of the present invention.

Figure 8:
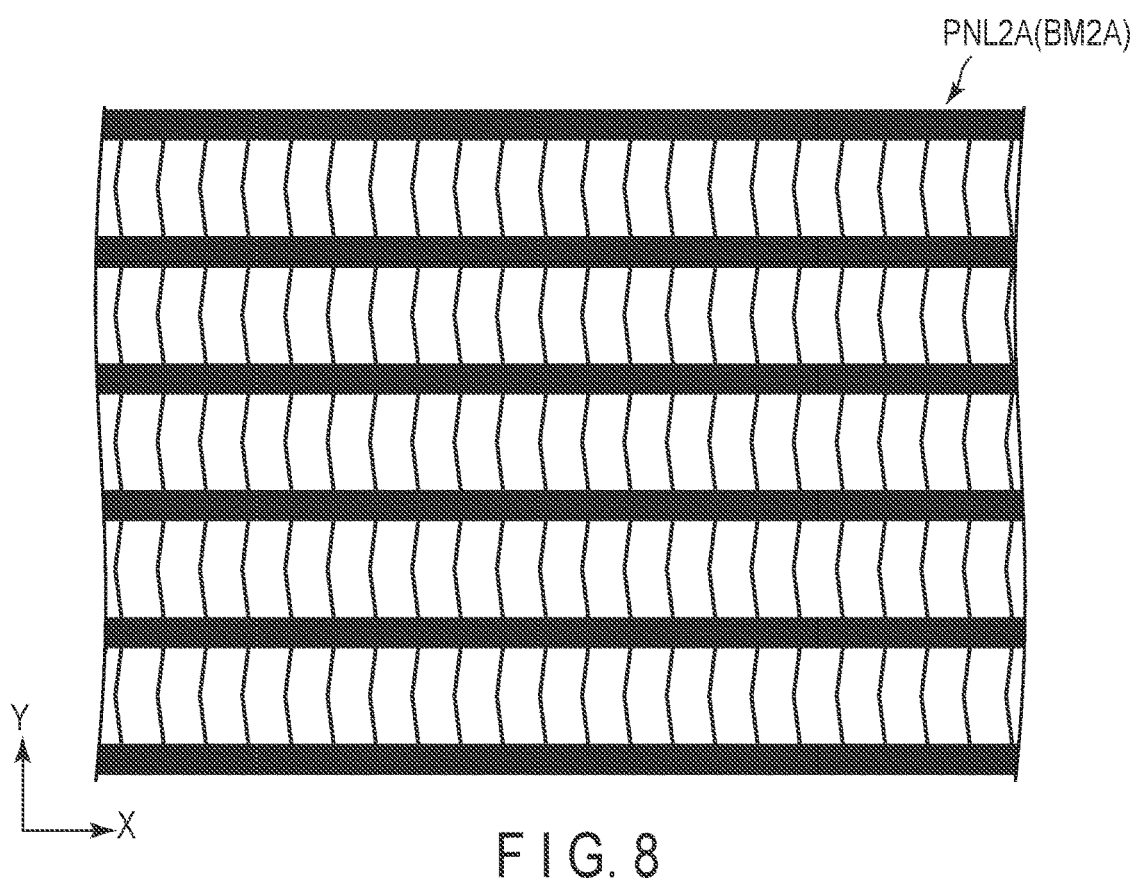
FIG. 8 is a plan view schematically illustrating a shape of a light-shielding pattern disposed in a dimming panel according to a first comparative example.

FIG. 8 is a plan view schematically illustrating a shape of a light-shielding pattern BM2A disposed in a dimming panel PNL2A according to a first comparative example. As shown in FIG. 8, in the dimming panel PNL2A according to the first comparative example, the light-shielding pattern BM2A having the same pattern as the light-shielding pattern BM1 disposed in the liquid crystal display panel PNL1 is disposed. In a case where the same light-shielding patterns BM1 and BM2A are disposed in the liquid crystal display panel PNL1 and the dimming panel PNL2 as described above, a following problem occurs when an observer observes an image displayed on the liquid crystal display panel PNL1.

In general, the liquid crystal display panel PNL1 and the dimming panel PNL2A are bonded to each other after they are positionally adjusted such that the configuration elements common to both the panels, specifically, corresponding portions of the light-shielding patterns BM1 and BM2A overlap each other in planar view. However, so-called parallax difference that occurs at the time of image observation causes not only the light-shielding pattern BM1 of the liquid crystal display panel PNL1 disposed on an observer side but also the light-shielding pattern BM2A of the dimming panel PNL2A to enter a field of view of the observer. As a result, aperture ratios of the pixels PX1 may be different by location. If the aperture ratios of the pixels PX1 are different by location, luminance of the pixels PX1 differs by location, resulting in so-called luminance moire that causes a problem of degrading display quality.

Figure 9:
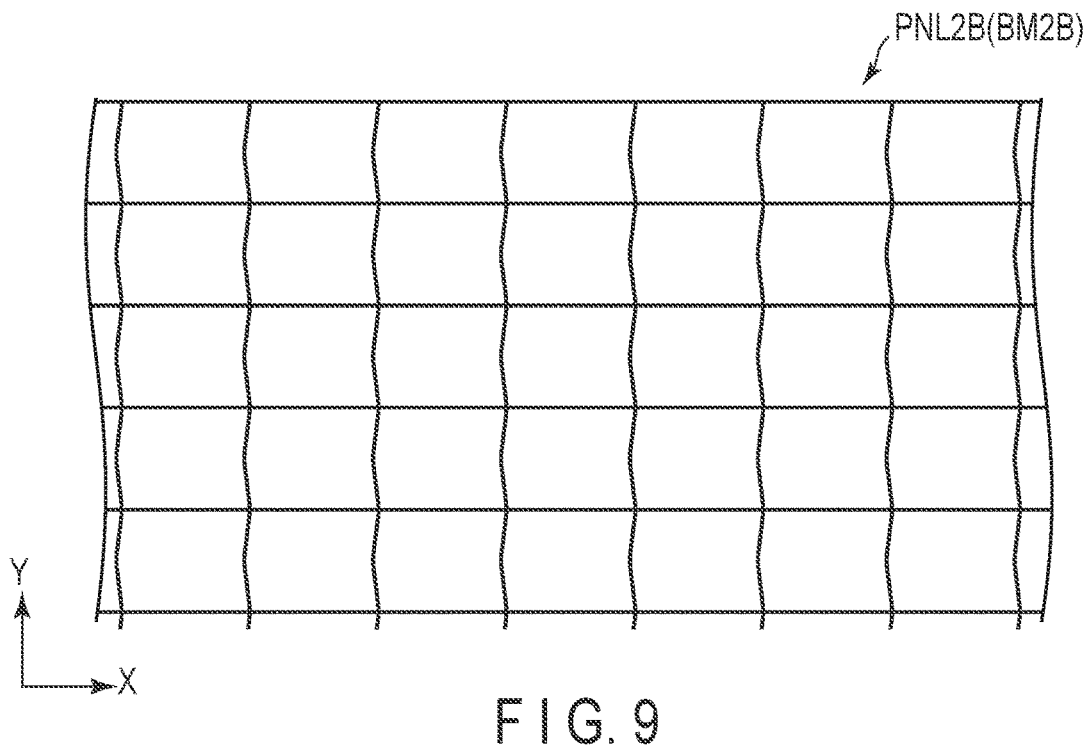
FIG. 9 is a plan view schematically illustrating a shape of a light-shielding pattern disposed in a dimming panel according to a second comparative example.

FIG. 9 is a plan view schematically illustrating a shape of a light-shielding pattern BM2B disposed in a dimming panel PNL2B according to a second comparative example. As shown in FIG. 9, in the dimming panel PNL2B according to the second comparative example, the light-shielding pattern BM2B is disposed so as to surround each pixel PX2 having the same area as the pixel PX1 of the liquid crystal display panel PNL1 and having a one-to-one relationship with the pixel PX1. In other words, the light-shielding pattern BM2B includes only the portions extending in the first direction X along the scanning lines G2 and the portions extending in the second direction Y while being bent into the chevron shape along the signal lines S2, and does not include the dummy light-shielding pattern DBM.

Also in this case, at the time of image observation, the parallax difference causes both the light-shielding pattern BM1 of the liquid crystal display panel PNL1 and the light-shielding pattern BM2B of the dimming panel PNL2B to enter the field of view of the observer. As a result, as in the case of the first comparative example illustrated in FIG. 8, the aperture ratios of the pixels PX1 may be different by location, and the above-described luminance moire may occur. In addition, unlike the light-shielding pattern BM2A according to the first comparative example, the light-shielding pattern BM2B does not have portions corresponding to the signal lines S1 provided in the liquid crystal display panel PNL1 (in other words, portions corresponding to the dummy light-shielding pattern DBM1 according to the present embodiment). As a result, the colors of the sub-pixels overlapping the portions extending in the second direction Y of the light-shielding pattern BM2B may be different by location, and the aperture ratios of the sub-pixels may also be different by location (for example, in a certain pixel PX1, the aperture ratio of the red sub-pixel PXR is small, and the aperture ratios of the green sub-pixel PXG and the blue sub-pixel PXB are larger than the aperture ratio of the sub-pixel PXR, but in another pixel PX1 at a different location, the aperture ratio of the green sub-pixel PXG is small, and the aperture ratios of the blue sub-pixel PXB and the red sub-pixel PXR are larger than the aperture ratio of the sub-pixel PXG). If the aperture ratios of the sub-pixels are different by location, so-called color moire occurs and causes a problem of degrading the display quality similarly to the luminance moire.

Incidentally, in a case where the liquid crystal display panel PNL1 and the dimming panel PNL2A are misaligned at the time of bonding them to each other, the luminance moire and the color moire may occur more conspicuously and cause a problem of greatly degrading the display quality.

Meanwhile, the dimming panel PNL2 according to the present embodiment includes the light-shielding pattern BM2 having the shape illustrated in FIG. 7. At the time of image observation with this configuration, the light-shielding pattern BM1 of the liquid crystal display panel PNL1 and the light-shielding pattern BM2 of the dimming panel PNL2 are observed by the observer as shown in FIG. 10.

Figure 10:
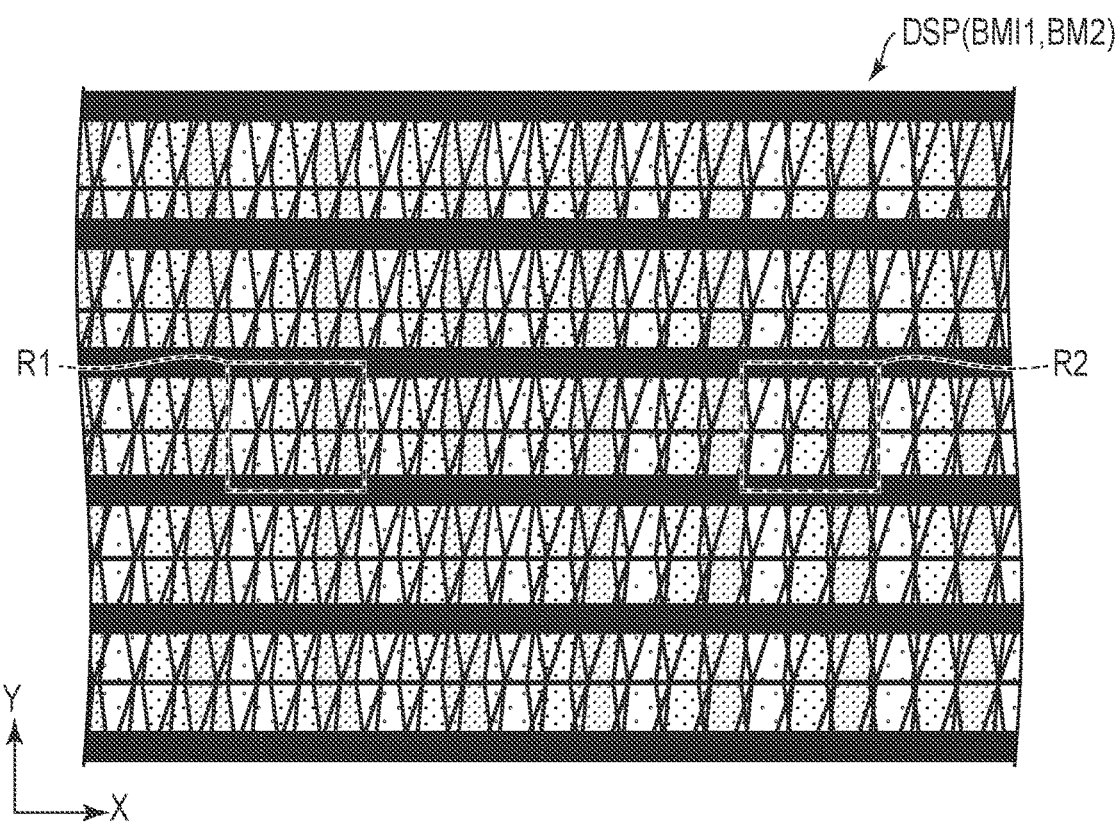
FIG. 10 is a plan view illustrating how the light-shielding patterns disposed in the liquid crystal display panel and the dimming panel included in the display device according to the embodiment look to an observer.

FIG. 10 is a view illustrating how the light-shielding patterns BM1 and BM2 look when the observer observes the display device DSP including the liquid crystal display panel PNL1 having the light-shielding pattern BM1 illustrated in FIG. 5 and the dimming panel PNL2 having the light-shielding pattern BM2 illustrated in FIG. 7. As shown in FIG. 10, the observer visually recognizes that the light-shielding pattern BM2 of the dimming panel PNL2 is entirely shifted upward and leftward in the figure due to the parallax difference. However, for example, as shown in two regions R1 and R2 surrounded by dotted lines in FIG. 10, the aperture ratio of each sub-pixel included in the pixel PX1 in the region R1 is approximately the same as the aperture ratio of each sub-pixel included in the pixel PX1 in the region R2. In other words, in the display device DSP according to the present embodiment, the aperture ratio of each sub-pixel included in each pixel PX1 can be approximately equalized to suppress the above-described color moire. In addition, as shown in the two regions R1 and R2, in the display device DSP according to the present embodiment, the aperture ratio of the pixel PX1 in the region R1 is also approximately the same as the aperture ratio of the pixel PX1 in the region R2.

In other words, in the display device DSP according to the present embodiment, the aperture ratio of each pixel PX1 can also be approximately equalized to suppress the above-described luminance moire. Therefore, degradation in display quality can be suppressed.

As described above, the display device DSP according to the present embodiment is provided with the dimming panel PNL2 having the light-shielding pattern BM2 including the dummy light-shielding pattern DBM1 corresponding to the signal lines S1 of the liquid crystal display panel PNL1 and the dummy light-shielding pattern DBM2 that halves each of the chevron-shaped regions that overlap(coincide) in planar view with the sub-pixels PXG, PXB, and PXR included in the pixels PX1 of the liquid crystal display panel PNL1. This configuration allows for approximately equalizing the aperture ratio of each pixel PX1 of the liquid crystal display panel PNL1 even if the parallax difference occurs as described above and, therefore, the luminance moire can be suppressed. In addition, it is also possible to approximately equalize the aperture ratio of each of the sub-pixels PXG, PXB, and PXR included in each pixel PX1 of the liquid crystal display panel PNL1 and, therefore, the color moire can be suppressed. In other words, according to the display device DSP of the present embodiment, it is possible to suppress the occurrence of moire and to suppress degradation in display quality in the display device including the two display panels.

Figure 11:
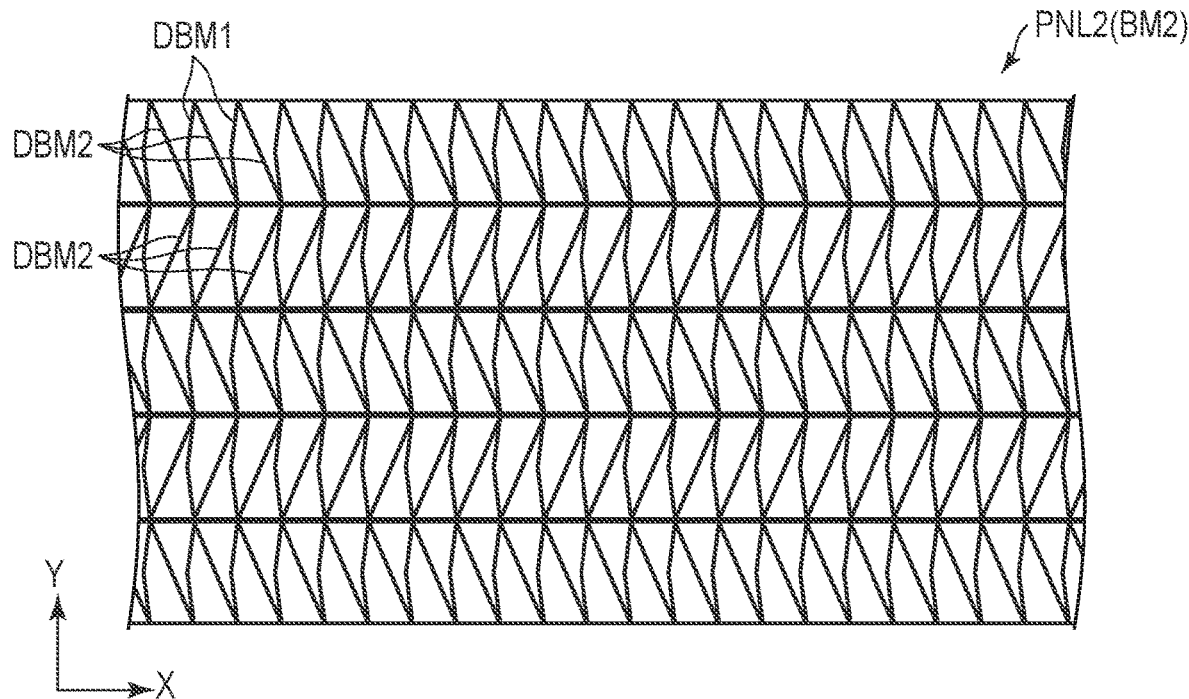
FIG. 11 is a plan view schematically illustrating another shape of the light-shielding pattern disposed in the dimming panel according to the embodiment.
Figure 12:
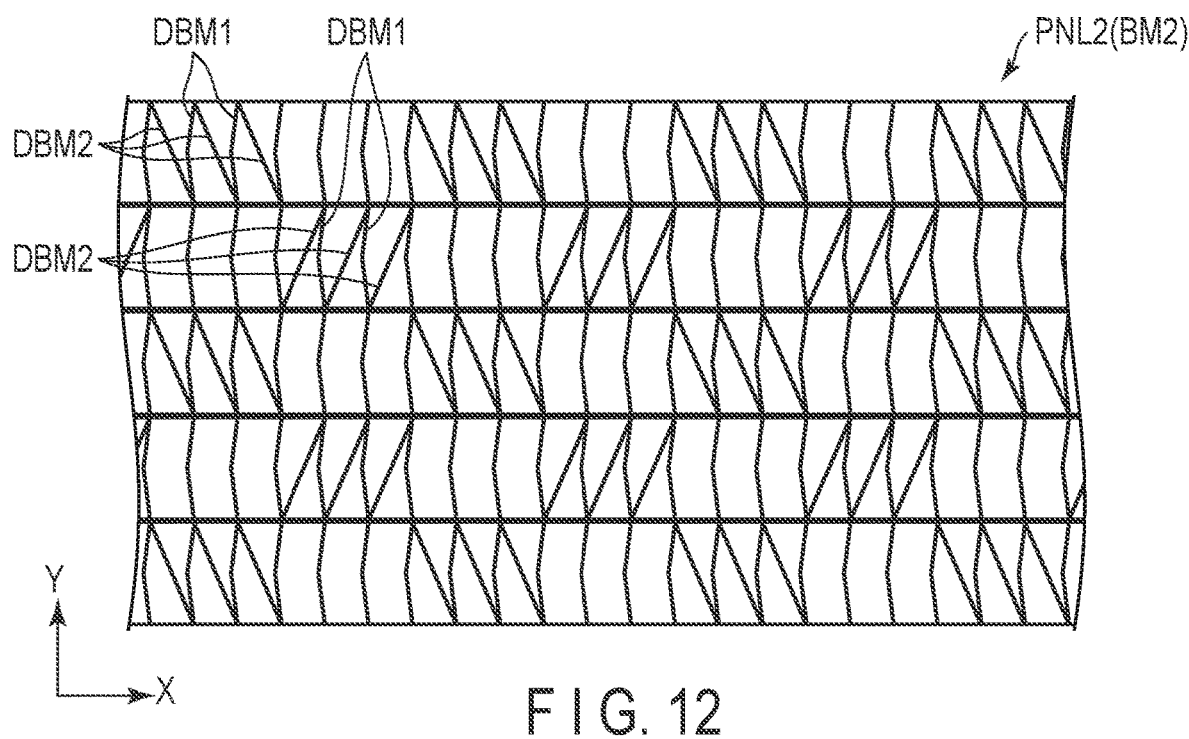
FIG. 12 is a plan view schematically illustrating still another shape of the light-shielding pattern disposed in the dimming panel according to the embodiment.
Figure 13:
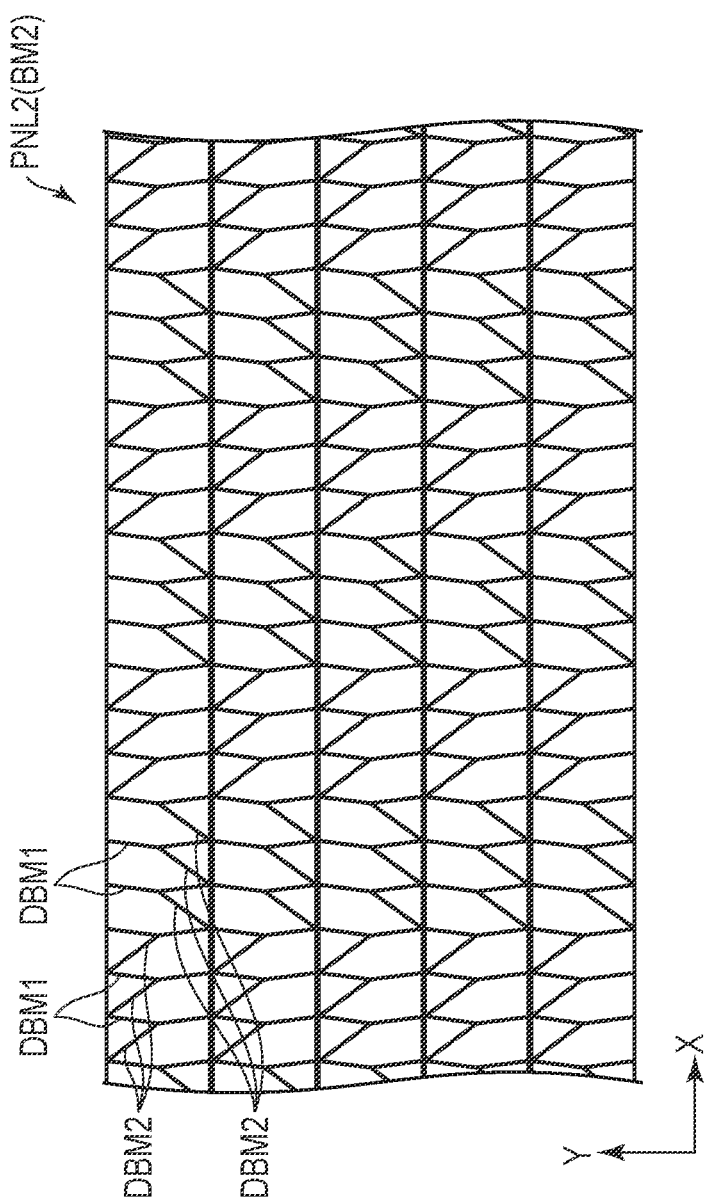
FIG. 13 is a plan view schematically illustrating still another shape of the light-shielding pattern disposed in the dimming panel according to the embodiment.

Incidentally, the dimming panel PNL2 may have the light-shielding pattern BM2 having a shape illustrated in FIGS. 11 to 13, for example, instead of the light-shielding pattern BM2 having the shape illustrated in FIG. 7.

FIG. 11 is a plan view schematically illustrating another shape of the light-shielding pattern BM2.

The light-shielding pattern BM2 illustrated in FIG. 11 is different from the light-shielding pattern BM2 illustrated in FIG. 7 in that the dummy light-shielding pattern DBM2 has portions extending in a direction that is horizontally inverted for each pixel row.

Also in this case, the aperture ratio of each sub-pixel included in each pixel PX1 can be approximately equalized among the pixels PX1 to suppress the color moire. Furthermore, the aperture ratio of each pixel PX1 can be approximately equalized among the pixels PX1 to suppress the luminance moire. In other words, degradation in display quality can be suppressed.

FIG. 12 is a plan view schematically illustrating still another shape of the light-shielding pattern BM2.

The light-shielding pattern BM2 illustrated in FIG. 12 is different from the light-shielding pattern BM2 illustrated in FIG. 7 in that the dummy light-shielding pattern DBM2 has, for only some of the pixels PX2, the portions extending in a direction that is horizontally inverted for each pixel row. Specifically, the portions of the dummy light-shielding pattern DBM2 are not provided for other pixels PX2 adjacent to the pixels PX2 for which the portions of the dummy light-shielding pattern DBM2 are provided.

Also in this case, the aperture ratio of each sub-pixel included in each pixel PX1 can be approximately equalized among the pixels PX1 to suppress the color moire. Furthermore, the aperture ratio of each pixel PX1 can be approximately equalized among the pixels PX1 to suppress the luminance moire. In other words, degradation in display quality can be suppressed.

FIG. 13 is a plan view schematically illustrating still another shape of the light-shielding pattern BM2.

The light-shielding pattern BM2 illustrated in FIG. 13 is different from the light-shielding pattern BM2 illustrated in FIG. 7 in that the dummy light-shielding pattern DBM2 has portions extending so as to each connect a midpoint of a chevron-shaped side forming the chevron-shaped regions that overlap(coincide) in planar view with the sub-pixels PXG, PXB, and PXR included in the pixels PX1 of the liquid crystal display panel PNL1 and a vertex located diagonally to that midpoint.

Incidentally, the portions of the dummy light-shielding pattern DBM2 provided in the light-shielding pattern BM2 illustrated in FIG. 13 are vertically and horizontally inverted for each of pixels PX2 adjacent to each other in the first direction X. As shown in FIG. 13, for example, the portions of the dummy light-shielding pattern DBM2 are provided for predetermined pixels PX2 so as to each connect the midpoint of the chevron-shaped side and a vertex located at an upper left with respect to that midpoint in the figure, and are provided for pixels PX2 adjacent to the predetermined pixels PX2 in the first direction X so as to each connect the midpoint of the chevron-shaped side and a vertex located at a lower left with respect to that midpoint in the figure.

Also in this case, the aperture ratio of each sub-pixel included in each pixel PX1 can be approximately equalized among the pixels PX1 to suppress the color moire. Furthermore, the aperture ratio of each pixel PX1 can be approximately equalized among the pixels PX1 to suppress the luminance moire. In other words, degradation in display quality can be suppressed.

In the present embodiment described above, the case where the pixels PX2 of the dimming panel PNL2 have the chevron shape like the pixels PX1 of the liquid crystal display panel PNL1 has been described. However, the pixels PX2 of the dimming panel PNL2 may have a shape different from the shape of the pixels PX1 of the liquid crystal display panel PNL1. In this case, as shown in (a) of FIG. 14, when predetermined pixels PX1 of the liquid crystal display panel PNL1 are turned on (in other words, when an image is formed by turning on the predetermined pixels PX1), the pixels PX2 of the dimming panel PNL2 are controlled such that, as shown in (b) of FIG. 14, not only pixels PX2 corresponding to the predetermined pixels PX1 but also other pixels PX2 adjacent to those pixels PX2 are turned on.

In the case where the pixels PX2 of the dimming panel PNL2 have a shape different from the shape of the pixels PX1 of the liquid crystal display panel PNL1, turning on only the pixels PX2 corresponding to the pixels PX1 that form the image causes a problem that regions that do not overlap(coincide) in planar view with the corresponding pixels PX2 are not turned on and are dark within the pixels PX1 that form the image. However, as described above, the control under which not only the corresponding pixels PX2 but also other pixels PX2 adjacent to the corresponding pixels PX2 are turned on allows for turning on the entire pixels PX1 that form the image, and the occurrence of the above-described problem can be suppressed. Incidentally, the control under which not only pixels PX2 corresponding to pixels PX1 that form an image but also other pixels PX2 adjacent to the corresponding pixels PX2 are turned on may be performed not only in the case where the shapes of the pixels PX1 and PX2 are different but also in the case where the shapes of the pixels PX1 and PX2 are the same.

Figure 15:
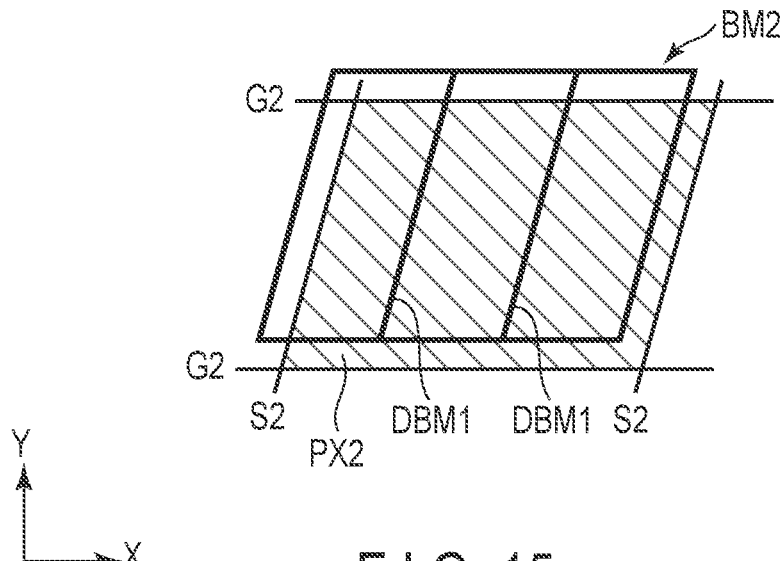
FIG. 15 is a view for explaining a pixel and the light-shielding pattern disposed in the dimming panel according to the embodiment.
Figure 16:
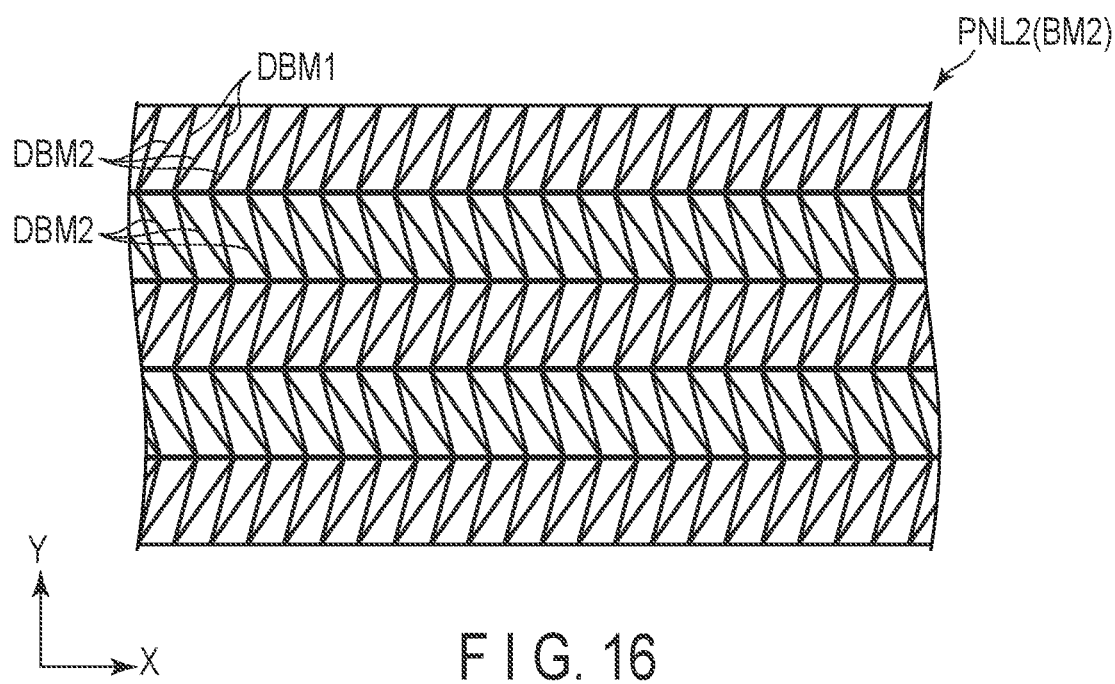
FIG. 16 is a plan view schematically illustrating a shape of the light-shielding pattern disposed in the dimming panel according to the embodiment.

As shown in FIG. 15, also in this case, the light-shielding pattern BM2 provided for the pixels PX2 of the dimming panel PNL2 desirably includes the dummy light-shielding pattern DBM1 having portions that extend in the second direction Y and are disposed at the same pitch as the sub-pixels PXG, PXB, and PXR included in the pixels PX1 of the liquid crystal display panel PNL1. In addition, as shown in FIG. 16, the light-shielding pattern BM2 may further include the dummy light-shielding pattern DBM2 having portions extending in an oblique direction so as to halve each of regions partitioned by the portions extending along the signal lines S2, the portions extending along the scanning lines G2, and the dummy light-shielding pattern DBM1. With this configuration, the aperture ratio of each sub-pixel included in each pixel PX1 can be approximately equalized among the pixels PX1 to suppress the color moire. Furthermore, the aperture ratio of each pixel PX1 can be approximately equalized among the pixels PX1 to also suppress the luminance moire. In other words, degradation in display quality can be suppressed.

Figure 17:
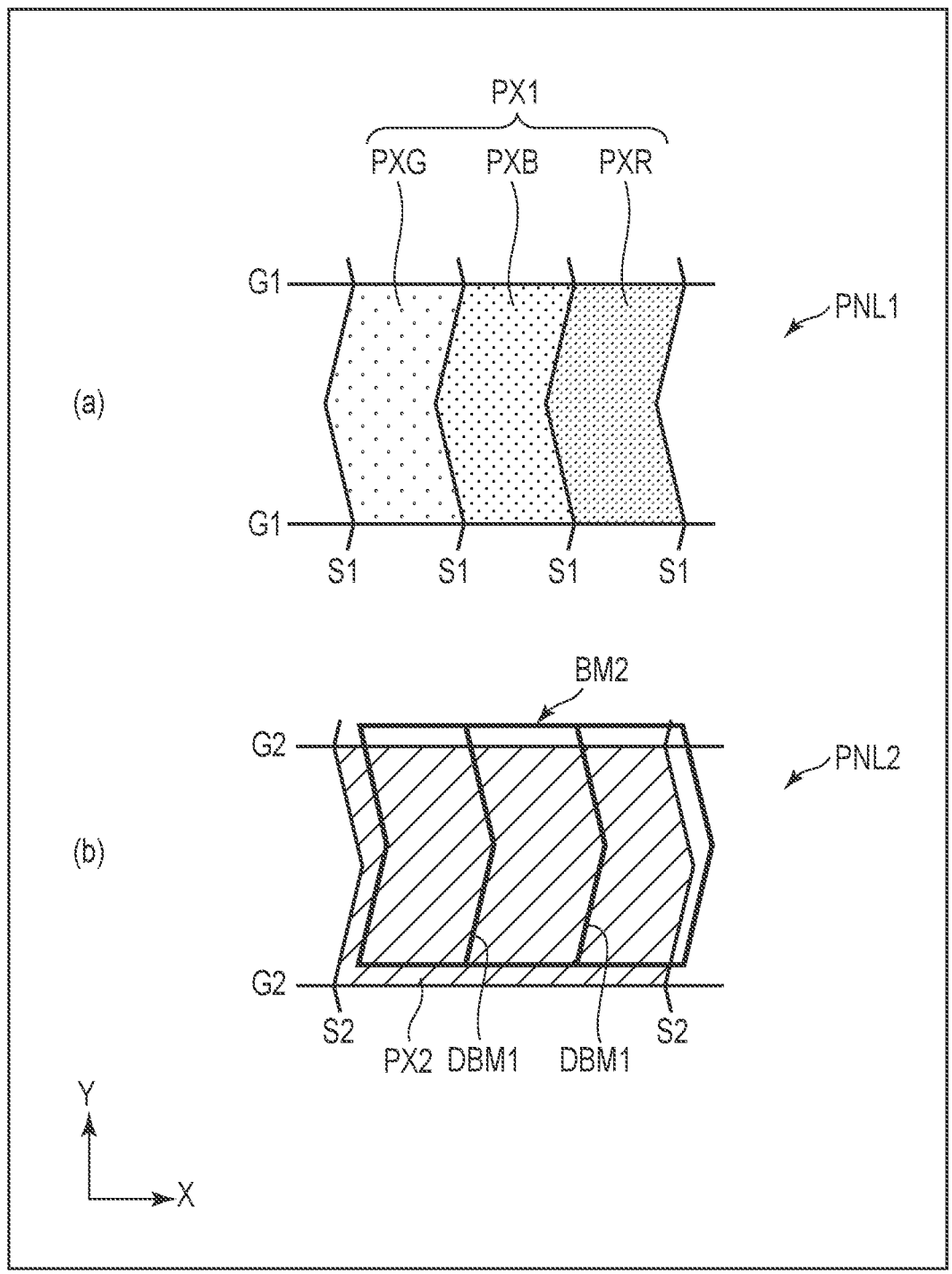
FIG. 17 is a view for explaining the shape of the pixels disposed in the liquid crystal display panel and shapes of the pixels and the light-shielding pattern disposed in the dimming panel according to the embodiment.

For example, as shown in (a) and (b) of FIG. 17, examples of the case where the pixels PX2 of the dimming panel PNL2 have a shape different from the shape of the pixels PX1 of the liquid crystal display panel PNL1 include a case where the signal lines S2 extend in the second direction Y while being bent inversely to the signal lines S1 of the liquid crystal display panel PNL1, and the pixels PX2 are each disposed in a region partitioned by these signal lines S2 and the scanning lines G2 extending along the first direction X. In this case, as shown in (b) of FIG. 17, the light-shielding pattern BM2 includes portions extending in the first direction X along the scanning lines G2, portions extending in the second direction Y while being bent into a chevron shape along the signal lines S2, and the dummy light-shielding pattern DBM1 extending along the signal lines S2 and overlapping the pixels PX2 in planar view. The dummy light-shielding pattern DBM1 has the portions disposed at the same pitch as the sub-pixels PXG, PXB, and PXR of the liquid crystal display panel PNL1.

Also in this case, the aperture ratio of each sub-pixel included in each pixel PX1 can be approximately equalized among the pixels PX1 to suppress the color moire. Furthermore, the aperture ratio of each pixel PX1 can be approximately equalized among the pixels PX1 to also suppress the luminance moire. In other words, degradation in display quality can be suppressed. Incidentally, in the case of the light-shielding pattern BM2 illustrated in (b) of FIG. 17, the dummy light-shielding pattern DBM1 has the portions extending in an oblique direction in each of the regions that overlap(coincide) in planar view with the sub-pixels PXG, PXB, and PXR included in the pixels PX1 of the liquid crystal display panel PNL1, and thus also functions as the dummy light-shielding pattern DBM2 illustrated in FIG. 7. Therefore, an advantage that the dummy light-shielding pattern DBM2 is not required to be formed can be obtained.

According to the embodiment described above, the display device DSP includes the dimming panel PNL2 having the light-shielding pattern BM2 that can approximately equalize the aperture ratio of each pixel PX1 of the liquid crystal display panel PNL1 and can approximately equalize the aperture ratio of each sub-pixel included in each pixel PX1 among the pixels PX1 even if the parallax difference occurs. Therefore, it is possible to suppress the occurrence of moire in the display device including the two display panels and to suppress degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
    a first display panel including a display area for displaying an image;
    a second display panel including a dimming area for controlling brightness of the display area; and
    an adhesive layer that bonds the first display panel and the second display panel to each other, wherein
    the first display panel comprises:
    a plurality of first scanning lines extending along a first direction; a plurality of first signal lines extending in a second direction intersecting the first direction; a plurality of first pixels each disposed in a region partitioned by the first scanning lines and the first signal lines; and a first light-shielding pattern extending along the first scanning lines and the first signal lines,
    the second display panel comprises:
    a plurality of second scanning lines extending along the first direction; a plurality of second signal lines extending in the second direction; a plurality of second pixels each disposed in a region partitioned by the second scanning lines and the second signal lines; and a second light-shielding pattern including a first light-shielding portion extending along the second scanning lines and the second signal lines, and a second light-shielding portion overlapping the first pixels of the first display panel in planar view,
    the second pixels each have a shape identical to a shape of the first pixels of the first display panel,
    the second light-shielding portion includes third light-shielding portions extending along the first signal lines of the first display panel, and fourth light-shielding portions extending in an oblique direction different from both the first direction and the second direction so as to divide each of regions that overlap in planar view with a plurality of sub-pixels included in the first pixels of the first display panel, and
    the third light-shielding portions and the fourth light-shielding portions are both disposed at a same pitch as the sub-pixels included in the first pixels of the first display panel.

2. A display device of claim 1, wherein
    the fourth light-shielding portions extend in the oblique direction so as to halve each of the regions that overlap in planar view with the sub-pixels included in the first pixels of the first display panel.

3. A display device of claim 1, wherein
    the fourth light-shielding portions extend in a direction that is inverted for each row of the first pixels of the first display panel.

4. A display device of claim 1, wherein
    the fourth light-shielding portions are each disposed in a region that overlaps in planar view with a predetermined first pixel of the first display panel, and are not disposed in a region that overlaps in planar view with a first pixel adjacent to the predetermined first pixel.

5. A display device comprising:
    a first display panel including a display area for displaying an image;
    a second display panel including a dimming area for controlling brightness of the display area; and
    an adhesive layer that bonds the first display panel and the second display panel to each other, wherein
    the first display panel comprises:

a plurality of first scanning lines extending along a first direction; a plurality of first signal lines extending in a second direction intersecting the first direction; a plurality of first pixels each disposed in a region partitioned by the first scanning lines and the first signal lines; and a first light-shielding pattern extending along the first scanning lines and the first signal lines, the second display panel comprises:

a plurality of second scanning lines extending along the first direction; a plurality of second signal lines extending in the second direction; a plurality of second pixels each disposed in a region partitioned by the second scanning lines and the second signal lines; and a second light-shielding pattern including a first light-shielding portion extending along the second scanning lines and the second signal lines, and a second light-shielding portion overlapping the first pixels of the first display panel in planar view, the second pixels each have a shape different from a shape of the first pixels of the first display panel, and the second light-shielding portion includes third light-shielding portions that extend along the second signal lines and are disposed at a same pitch as a plurality of sub-pixels included in the first pixels of the first display panel.

6. A display device of claim 1, wherein the second display panel comprises:

a first substrate; a second substrate opposed to the first substrate; and a liquid crystal layer held between the first substrate and the second substrate, and the first substrate comprises:

pixel electrodes as many as the second pixels; a common electrode opposed to the pixel electrodes; the second scanning lines; the second signal lines; and the second light-shielding pattern.

7. A display device of claim 6, wherein the second light-shielding pattern is formed of an untransparent metal material and connected to the common electrode.

8. A display device of claim 1, wherein the second display panel comprises:

a first substrate; a second substrate opposed to the first substrate; and a liquid crystal layer held between the first substrate and the second substrate, the first substrate comprises:

pixel electrodes as many as the second pixels; a common electrode opposed to the pixel electrodes; the second scanning lines; and the second signal lines, and the second substrate comprises the second light-shielding pattern.

9. A display device of claim 1, wherein a second pixel overlapping in planar view a first pixel forming the image and a plurality of second pixels adjacent to the second pixel are controlled to be turned on.

* * * * *